US011048798B2

(12) United States Patent
Hayrynen et al.

(10) Patent No.: US 11,048,798 B2
(45) Date of Patent: *Jun. 29, 2021

(54) METHOD FOR DETECTING LIBRARIES IN PROGRAM BINARIES

(71) Applicant: Synopsys, Inc., Mountain View, CA (US)

(72) Inventors: Antti Hayrynen, Oulu (FI); Antti Vayrynen, Oulu (FI)

(73) Assignee: SYNOPSYS, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,525

(22) Filed: May 12, 2020

(65) Prior Publication Data

US 2020/0380125 A1 Dec. 3, 2020

Related U.S. Application Data

(63) Continuation of application No. 15/514,498, filed as application No. PCT/US2015/052054 on Sep. 24, 2015, now Pat. No. 10,650,145.

(51) Int. Cl.
*G06F 21/56* (2013.01)
*G06N 20/00* (2019.01)
(Continued)

(52) U.S. Cl.
CPC .............. *G06F 21/563* (2013.01); *G06F 8/47* (2013.01); *G06F 9/44521* (2013.01);
(Continued)

(58) Field of Classification Search
USPC ........................................................ 726/23
See application file for complete search history.

(56) References Cited

U.S. PATENT DOCUMENTS 9,274,769 B1 * 3/2016 Gschwind ............... G06F 8/443
10,650,145 B2 5/2020 Hayrynen et al.
(Continued)

FOREIGN PATENT DOCUMENTS

EP   2759956 A1   7/2014
EP   3001319 B1   11/2017

OTHER PUBLICATIONS

European Patent Office Communication under Rule 71(3) EPC in European Application No. 14186376.1, dated Dec. 6, 2017 (5 pages).
(Continued)

*Primary Examiner* — Kambiz Zand
*Assistant Examiner* — Benjamin A Kaplan
(74) *Attorney, Agent, or Firm* — Sterne, Kessler, Goldstein & Fox P.L.L.C.

(57) ABSTRACT

This document discloses a solution for detecting, by a computer apparatus, computer program library in a binary computer program code. A method according to an embodiment of the solution comprises in the computer apparatus: acquiring a reference computer program library file in a binary form; and determining at least one signature set of binary data from a read-only section of the reference computer program library, wherein the at least one signature set of binary data is determined to contain constant binary data that is unique to the reference computer program library; the method further comprising a testing phase comprising: acquiring binary computer program code and at least one signature set of binary data associated with each reference computer program library to be searched for; searching the binary computer program code for said at least one signature set of binary data; and upon determining that a signature set of binary data has been detected in the binary computer program code, determining that the binary computer program code comprises the computer program library associated with the detected signature set of binary data.

20 Claims, 7 Drawing Sheets

(51) Int. Cl.
  *G06F 21/51* (2013.01)
  *G06F 9/445* (2018.01)
  *G06F 8/41* (2018.01)
  *G06F 11/36* (2006.01)
  *G06F 21/57* (2013.01)

(52) U.S. Cl.
  CPC ........ *G06F 11/362* (2013.01); *G06F 11/3688* (2013.01); *G06F 21/51* (2013.01); *G06F 21/577* (2013.01); *G06N 20/00* (2019.01); *G06F 2221/033* (2013.01)

(56) References Cited

U.S. PATENT DOCUMENTS

2015/0169294 A1* 6/2015 Brock ................ G06F 8/44
  717/164

2017/0277890 A1   9/2017 Hayrynen et al.

OTHER PUBLICATIONS

Newsome, J. et al., "Polygraph: Automatically Generating Signatures for Polymorphic Worms," Security and Privacy, 2005 IEEE Symposium, Oakland, CA, May 8-11, 2005, pp. 226-241, XP010798375.

Van Emmerik M., "Identifying Library Functions in Executable File Using Patterns," Software Engineering Conference, 1998, Proceedings, 1998 Australian Adelaide, SA, Australia, IEEE Comput. Soc., USA, Nov. 9-13, 1998, pp. 90-97, XP010314478.

International Search Report and Written Opinion of the International Searching Authority dated Dec. 21, 2015 in International Application No. PCT/US2015/052054, 12 pages.

Extended European Search Report dated Jan. 29, 2015 in European Application No. 14186376.1, 11 pages.

* cited by examiner

METHOD FOR DETECTING LIBRARIES IN PROGRAM BINARIES

CROSS-REFERENCE TO RELATED APPLICATIONS

This application is a continuation of U.S. patent application Ser. No. 15/514,498, filed Mar. 24, 2017, which was issued as U.S. Pat. No. 10,650,145.

TECHNICAL FIELD

The invention relates to the field of computer science and, particularly, to detecting a computer program library from a binary code.

TECHNICAL BACKGROUND

In computer security applications, a computer program code is analyzed in an attempt to detect vulnerabilities or malicious computer programs in the computer program code. The analysis may be directed to computer program libraries that may be defined as an implementation of one or more basic functions that may be used by higher level programs. Libraries enable reuse of the basic functions by multiple independent computer programs, thus improving the efficiency of the computer programming. The analysis may comprise detecting the libraries from a binary code. A conventional solution has been to search for character strings such as letters or numbers from bytes of the binary code. One problem with such a solution is that there exist libraries that do not necessary contain any eligible character strings. Libraries may be detected in other applications, as well, e.g. when determining software licensing status of a computer program.

BRIEF DESCRIPTION

According to an aspect of the invention, there is provided the subject matter defined by the independent claims.

Embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
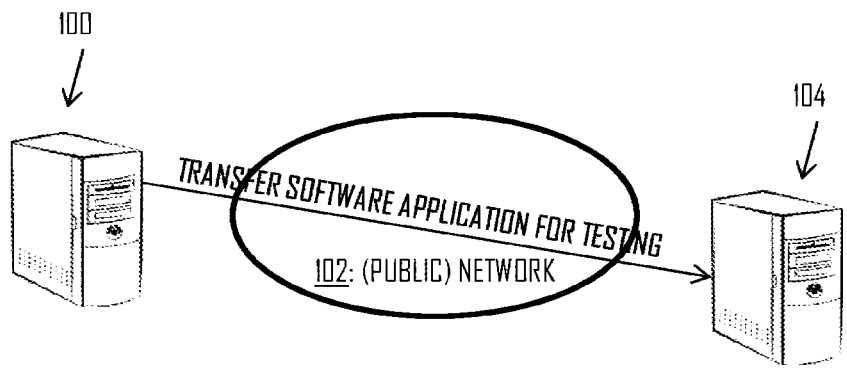
FIG. 1 illustrates a computer program testing scenario to which embodiments of the invention may be applied.

FIG. 1 illustrates a testing scenario to which embodiments of the invention may be applied. Embodiments of the invention may be realized by a testing computer 104 configured to test computer program products such as computer program applications. The testing computer 104 may be connected to one or more communication or computer networks 102 in order to exchange data with other computers 100. The exchanged data may comprise computer programs to be tested that may be transferred to the testing computer 104 for testing through the network(s) 102. The exchanged data may comprise test results that are transferred from the testing computer 104 to a client computer. The computer 100 may be an application server computer storing one or more computer program applications available for public access, e.g. a server of a commercial mobile application store. However, the computer 100 may be another type of server computer storing computer program applications or, in general, computer program products.

The testing computer 104 may be configured to scan the computer program products for computer program libraries and, upon finding a computer program library, perform an analysis with respect to the contents or status of the computer program library. With respect to the contents, the analysis may comprise determining whether or not the computer program library is known to be vulnerable to exploits. One or more exploits may be provided in malicious software (malware) such as computer viruses, worms, Trojan horses, ransomware, spyware, adware, or scareware. The analysis may be based on checking whether or not the detected library is indicated in a database storing information on libraries known to be vulnerable to exploits. This analysis may be called vulnerability management. With respect to the status, the analysis may comprise determining licensing status of the library, e.g. whether or not the library is associated with an up-to-date and valid license. Such license management may be used to avoid or detect license infringements. The analysis may comprise other functions performed with respect to the library in order to improve computer security.

The computer program library may be defined as a computer program code and/or data that may be used to develop computer programs and computer program applications. It is conventionally designed to assist generating and executing computer program products. A computer program library may consist of pre-written code, classes, procedures, scripts, configuration data, etc. A computer program developer may add a computer program library to a computer program product to achieve more functionality and/or to automate a process without writing the programming code of the library, thus reducing the amount of code written by the developer. For example, when developing a mathematical program or application, a developer may add a mathematics software library to the program to eliminate the need for writing complex mathematical functions. All of the available functions within a software library can just be called within a computer program body without defining them explicitly. Similarly, a compiler might automatically add a related software library to a program on run time.

Figure 2:
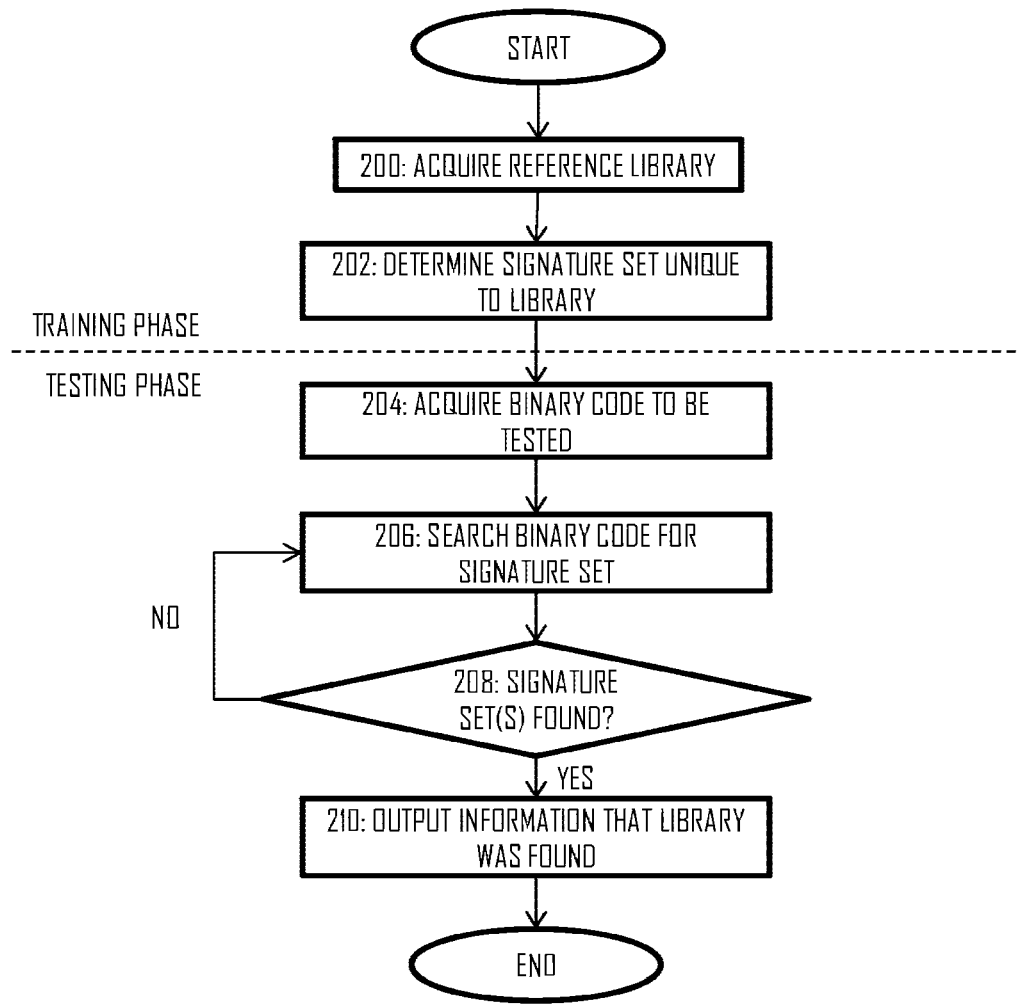
FIG. 2 illustrates a process for testing a computer program product according to an embodiment of the invention.

FIG. 2 illustrates a flow diagram of a process for method for searching and detecting, by a computer apparatus such as the testing computer 104, a computer program library in a binary computer program code according to an embodiment of the invention. The method comprises a training phase in which search parameters are defined for each reference computer program library that are to be searched for. The method comprises, during the training phase, acquiring a reference computer program library file in a binary form (block 200) and determining at least one signature set of binary data from a read-only section of the reference computer program library (block 202). The read-only section comprises data that is not rewritten during the execution of the computer program library. Additionally, the data in the read-only section is typically unique to the library and not found in any other library. Thus, the at least one signature set of binary data may be determined to contain constant binary data that is unique to the reference computer program library.

The signature set of binary data may comprise one or more signatures, wherein each signature forms a unit of constant binary data. The signature(s) form(s) a signature set representing a reference data set that is searched from a binary code during the testing phase. In block 204 of the testing phase, such a binary code is acquired, e.g. by acquiring a computer program application for testing. The search parameters such as the signature(s) associated with each reference library may also be acquired in block 204. In block 206, the binary computer program code is searched for said at least one signature set of binary data. Upon determining in block 208 that said at least one signature set of binary data has been detected in the binary computer program code, it may be determining that the binary computer program code comprises the computer program library. As a consequence, the process may output information that the computer program library associated with the detected signature has been found from the binary code. As a consequence, the binary code or a computer program application associated with the binary code may be subjected to further analysis, e.g. analysis of vulnerabilities or the licensing status of the library.

A technical effect of the above-described process for detecting the computer program library is that the searching is carried out from the binary code. As a consequence, semantic contents of the library will not affect the outcome of the searching. The library may be identified regardless of the contents, e.g. the contents may contain character strings, data tables, pictures, etc.

The above-described method uses a pre-analysis of one or more reference libraries and identifies constant data in the reference libraries. The constant data is assumed or known to remain unchanged even when the library is compiled. Such constant data may be found in the read-only portion (.rodata) of the libraries. This constant data or a subset of the constant data may then be used to form the at least one signature representing constant data that is unique to the reference library and that may be used to identify the library in a binary code. The signature may be provided as the binary code such that it may be directly mapped to the binary code that is scanned for the presence of a library corresponding to the reference library.

Since the amount of bits in an arbitrary binary code is huge as is the number of possible different bit combinations, each signature may be sufficiently long to ensure low probability of false detections. In an embodiment, each signature may comprise thousands of bits that are consecutive bits between a starting point in the read-only section and an ending point in the read-only section of the reference library. In an embodiment, the number of consecutive bits acquired from the reference library to each signature is higher than one thousand bits. In another embodiment, the number of consecutive bits acquired from the reference library to each signature is higher than ten thousand bits.

In an embodiment, the training phase is carried out as one computer program in one apparatus, e.g. one testing computer, while the testing phase is carried out as another, different computer program in another apparatus, e.g. another testing computer.

In an embodiment, block 206 of the testing phase may be carried out by scanning the raw binary code and correlating the binary code with the binary signatures. In other words, the searching or scanning may be carried out without analysing the syntax or semantics of the binary code. As a consequence, the search may be carried out extremely fast. This also distinguishes the invention from many other search processes that attempt to analyse the syntax of the binary code, e.g. convert the binary code to ASCII characters and analyse the character strings. Such other methods may try to reverse engineer functionality or control flow of the software to compare the functionality and/or the control flow with the functionality and/or the control flow of the reference library. These methods usually involve some sort of abstractions made from the reference library and the software binary code being tested. In the present testing method, the input binary code may just be read byte-by-byte, and no functionality information or abstractions of the binary code are required.

If no signature of a reference library is found in the binary code, the process of FIG. 2 may determine that the binary code does not comprise the reference library.

Figure 3:
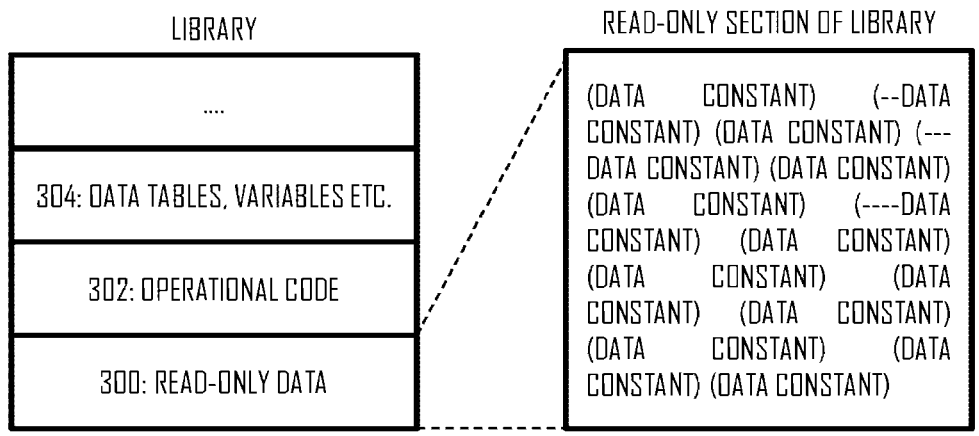
FIG. 3 illustrates a structure of a computer program library.

FIG. 3 illustrates contents of a computer program library. The computer program library may comprise the above-described read-only section 300 comprising data sets that remain constant even though the library is compiled to different architectures. Such data constants may be provided next to each other or a compiler may induce bytes, e.g. padding, between the data constants, as illustrated by dashes in some data constants of FIG. 3. The library further comprises an operational code portion 302 or a text segment comprising executable instructions that may be rewritten during run-time or when compiled to different architectures. The library further comprises a data segment 304 comprising global and/or static variables initialized by the programmer. The data segment may also be rewritten during the run-time or when compiled into different architectures. The library may contain other sections or segments as well, as known to the person skilled in the field of computer programming.

Figure 4:
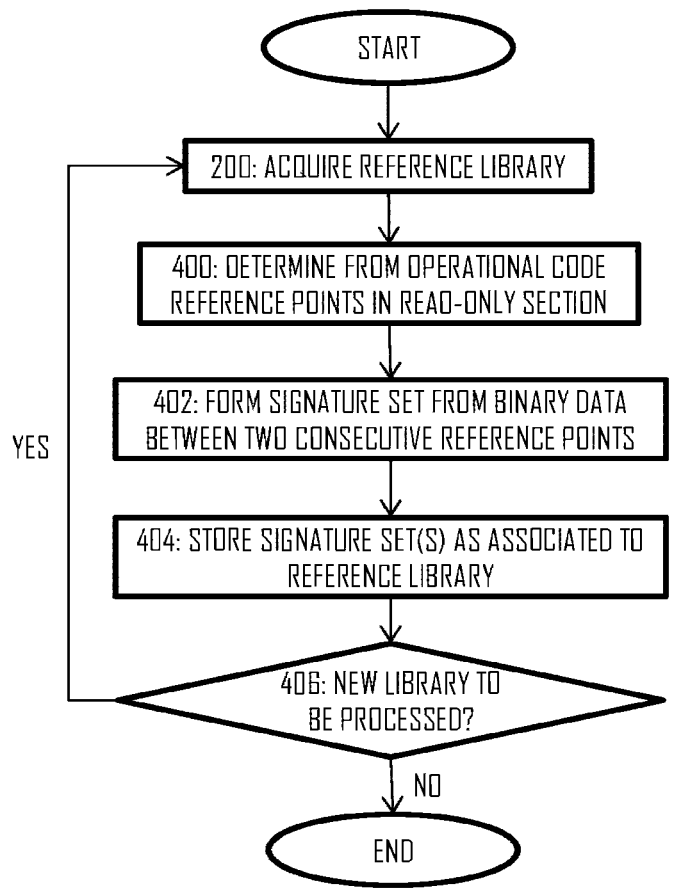
FIGS. 4 and 5 illustrate embodiments of a training phase of the testing process.
Figure 5:
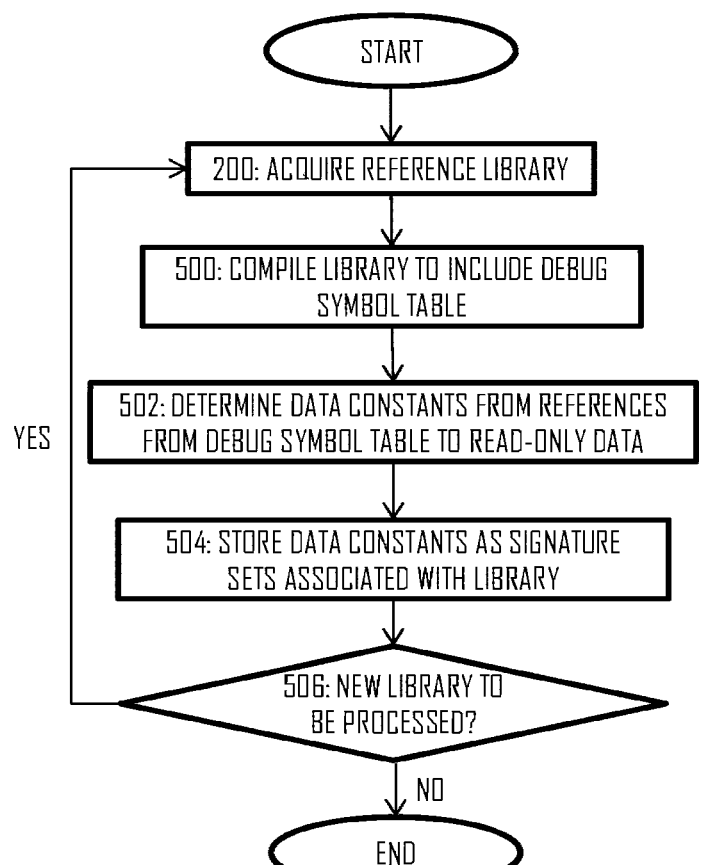

As described above, the signatures are extracted from the read-only section of the library. Some libraries may have the whole content of the read-only section as constant data in which case an arbitrary section may be taken as the signature, e.g. even the whole read-only section. However, in other libraries, the read-only section may comprise multiple instances of constant data, and the read-only section itself may not directly indicate where each data constant usable as the signature(s) reside(s), e.g. start and end. This is illustrated in FIG. 3 as text "data constants" at various locations in the read-only data 300. With respect to such libraries, let us describe some embodiments for extracting the signature(s) with reference to FIGS. 4 and 5. In the embodiments of FIGS. 4 and 5, the syntax and/or semantics of the reference library may be interpreted in order to find the data constants that may be used as the signatures.

FIG. 4 illustrates an embodiment where references from the operational code section 302 to the read-only data section 300 are used in determining the data constants that may be used as the signatures of binary data. Referring to FIG. 4, the reference library is acquired in block 200, e.g. by downloading the reference library to a computer that executes the process of FIG. 4 or by retrieving the reference library from a physical memory of the computer. In block 400, the operational code section 302 of the library is extracted and its syntax and/or semantics is interpreted by searching for an operational code that comprises a reference to the read-only data section 300. The reference refers to a specific location in the read-only data section 300 or, in other words, it indicates an offset in a binary data of the read-only section 300. Block 400 may comprise finding all the references of the operational code to the read-only data section 300. In another embodiment, a subset of references to the read-only section is detected but such that each of the detected references is consecutive to at least one other detected reference such that no undetected references remain between the detected references. The embodiment of FIG. 4 may assume that the binary code or binary data between two locations of the read-only data section 300 to which the operational code 302 refers is the constant data that may be used as the signature. Let us assume example, where the consecutive locations of the read-only section 300 referred to from the operational code are denoted by X1, X2, X3. The binary data from X1 to X2 may be assumed to be the constant data as well as binary data from X2 to X3 but the binary data from X1 to X3 may not be present in the tested binary code because a computer program using the library may use the data constants in an arbitrary order. Therefore, it may necessary to detect the consecutive reference locations of the read-only data in connection with some libraries. The reference locations may thus be considered to divide the read-only section into a plurality of data constants usable as signatures.

In block 402, the signature(s) is/are formed. Block 402 may comprise extracting binary data between two consecutive reference locations of the read-only section. The reference points themselves may be excluded from the extracted binary data or they may be included in at least one signature set. The signature(s) may then be formed from the extracted binary data. Each signature may consist of binary data extracted from binary data between the two consecutive marked reference points of the read-only section. In this manner, a signature set comprising one or more signatures may be formed for the reference library. As the binary data between the two consecutive reference points represents dozens, hundreds, or thousands of lines of program code instructions, the binary data of each signature comprises a very long bit combination, which enables reliable identification of the correct library during the testing phase of the process of FIG. 2. Upon forming the signature(s) in block 402, the signatures may be stored in a memory in association with an identifier of the reference library from which the signature(s) have been extracted (block 404). Then, if there is a new reference library to be processed (block 406), signature se(s) of the new reference library may be extracted in a similar manner.

The embodiment of FIG. 5 employs another procedure for determining the data constants suitable for the signatures of a reference library. This embodiment employs debug symbols embedded into the reference library to indicate the locations of the data constants in the reference library. Referring to FIG. 5, after acquiring the reference library in a source code form in block 200, the source code of the reference library may be compiled such that debug symbols are included in the compiled library (block 500). The computer performing the process of FIG. 5 may apply, for example, a GNU Compiler Collection (GCC) system by specifying a parameter '−g' which provides the compiled code with the debug symbols. The debug symbols may be provided in a debug symbol table. The debug symbol table may map instructions in the compiled binary program to a corresponding variable, function, or line in the source code, and the mapping may indicate the location of each instruction in the compiled library. From the compiled reference library, the computer may search for determined instructions of the debug symbol table that indicate the location of the data constants of the read-only section 300. The instructions that not refer to a location of the read-only section 300 may be excluded. These sections of the debug symbol table may indicate the point of the read-only data section where the data constants begin, and the computer may then create the signatures from the binary data starting from the indicated points. After these reference locations from the debug symbol table to the read-only section 300 have been detected, the procedure may continue in a similar manner as described above in connection with blocks 402, 404. The computer may assume that binary data between two consecutive reference locations forms a data constant and, thus, the reference locations divide the read-only section into data constants. Block 502 may comprise extracting these data constants. Block 502 may comprise extracting one or a plurality of such signatures in this manner from the reference library and stored in the memory in association with an identifier of the reference library (block 504). Thereafter, a new reference library may be processed (block 506) or the process may end.

In an embodiment of FIG. 5, block 502 may comprise excluding those instructions or symbols of the debug symbol table that refer to the read-only section 300 but that are known to be always present in the read-only section 300 or known to be always included in a read-only section 300 of any library. Such symbols may include some or all of the following: .eh_frame_hdr, .eh_frame, and _FRAME_END_. Excluded symbols may include other symbols that have this property.

The processes of FIGS. 4 and 5 employ procedures where the locations of the data constants in the read-only data section are determined on the basis of the references to certain points in the read-only data section. According to another embodiment, the computer processing the reference library may be configured to extract the signatures by analyzing entropy of the read-only section. For example, the computer may search for the longest continuous set of ones or zeroes from the binary code of the reference library and use that as the signature.

Figure 6:
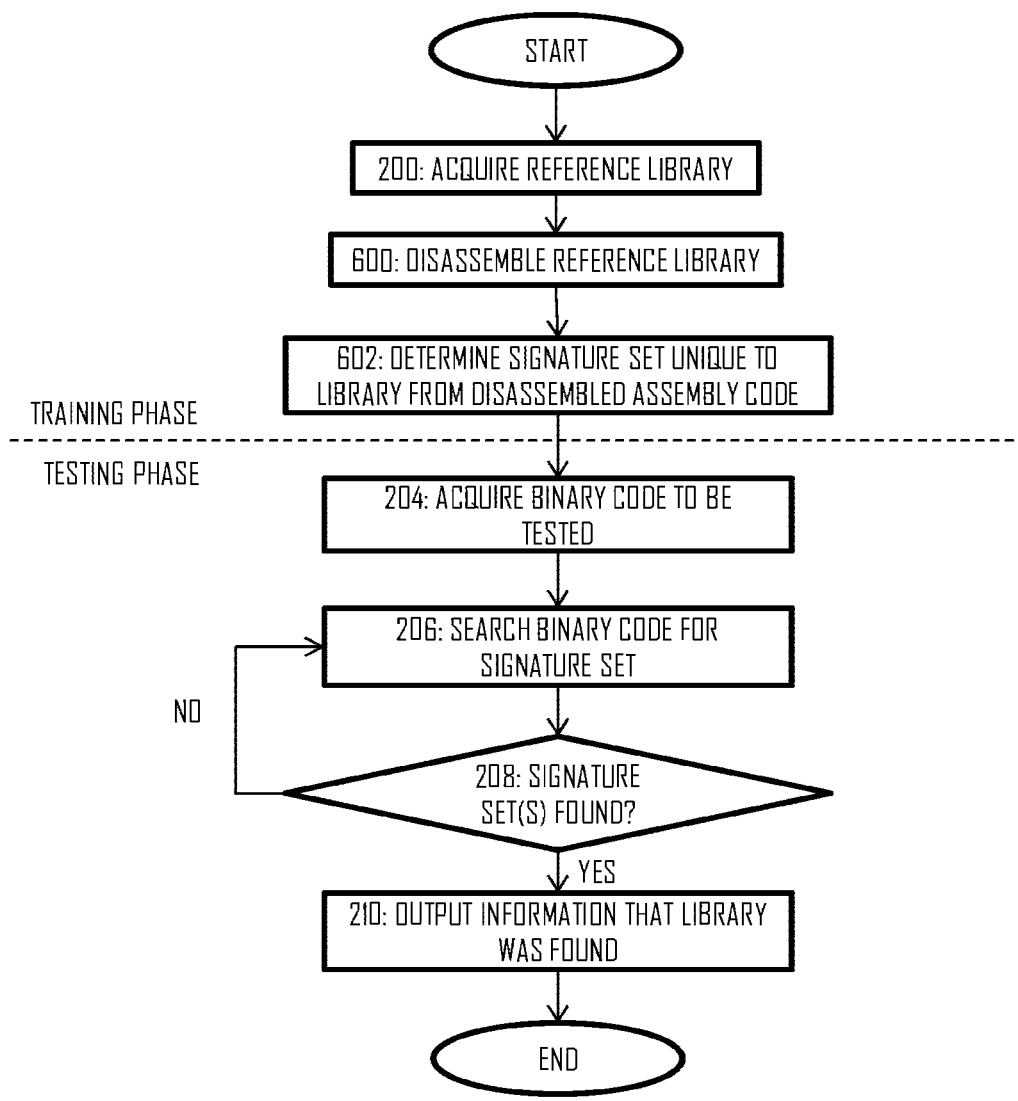
FIG. 6 illustrates a process for testing the computer program product, wherein the training phase comprises a disassembly process.

The computer performing the embodiments of the FIG. 2, 4, or 5 may be configured to distinguish and extract the signatures directly from the binary code of the reference library. However, since the operation of the computer is configured by a programmer who writes a computer program code defining the operations performed by the computer, e.g. computer program code defining the processes of FIGS. 2, 4, and 5, it may simplify the programming of the computer, if the computer is configured to disassemble the binary code of the reference library into a format that is more easily readable by a human. FIG. 6 illustrates such an embodiment of FIG. 2, and the embodiment of FIG. 6 is directly applicable to the processes of FIGS. 4 and 6. In FIG. 6, the same reference numbers as used in FIG. 2 represent the same or substantially similar operations. Referring to FIG. 6, upon acquiring the reference library in block 200, the computer may be configured to disassemble the binary code of the reference library into an assembly machine language in block 600. In block 602, the locations of the signatures are extracted by interpreting the syntax and/or semantics of the assembly program code and corresponding locations in the binary code are determined. The signatures may then be extracted from the binary code at locations determined by employing the process of FIG. 4 or 5.

Figure 7:
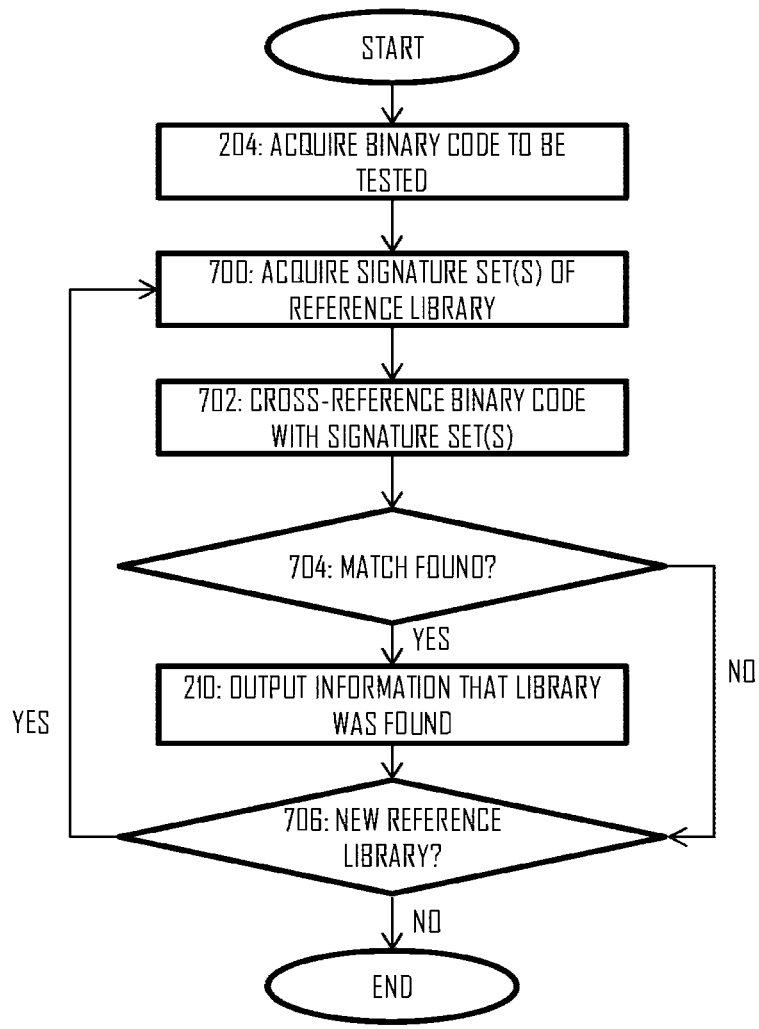
FIGS. 7 and 8 illustrate an embodiment of a testing phase of the testing process.

Above, some embodiments of the training phase of FIG. 2 are described. Now, let us describe some embodiments of the testing phase of FIG. 2 with reference to FIGS. 7 to 11. Referring to FIG. 7, upon acquiring the binary code to be tested for the presence of any one of the reference libraries, the testing computer performing the process may acquire (block 700) signature(s) of a reference library from a memory or the signature(s) may be downloaded from a server computer over a network connection. In block 702, the binary code being tested is cross-referenced with each signature associated with the reference library being searched for. Prior art teaches several correlation algorithms for cross-correlating binary data. One simple method is comparing the binary data comprising with the signature with an "exclusive not or" (XNOR) function. The function outputs a value "1" if two compared binary values are the same and a value "0" if they are different. In this manner, the binary data of the signature and a corresponding window of the binary code being tested may be compared and resulting values may be summed. The sum may then be compared with a threshold value and, if the sum exceeds the threshold (block 704), it may be determined that the binary code comprises the reference library. The threshold value may be set on the basis of the length of each signature, e.g. such that at least a determined percentage of the compared values shall match. Upon determining that the signature was found in the binary code, the process may proceed to block 210. In this manner, each signature of the reference library may be searched for from the binary code. Depending on the implementation, the whole binary code may be searched for one signature and, after completing the search and not finding the signature, the next signature may be taken into the search process. In another embodiment, a set of binary code may be taken and searched for each signature and, upon not finding any one of the signatures, a new set of binary code may be taken into the processing.

Upon completing the search for signatures set(s) of one reference library, it may be determined in block 706 if another reference library is to be searched from the binary code. If yes, the process may return to block 700. Otherwise, the process may end.

Figure 8:
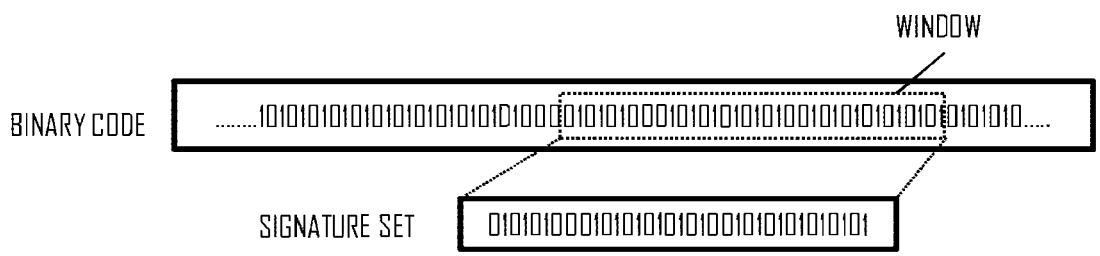

FIG. 8 illustrates the search of the binary code for the signature. A sliding window approach may be used, in which the above-mentioned window having the length matching with the length of the signature may be employed. The window may be used to acquire a subset of the binary code matching with the length of the signature for the comparison. The window may define an index of the first and the last binary value of the binary code to be taken into the comparison. Upon not finding the signature, the indices defining the first and the last binary value of the binary code may be incremented to switch the window and take a new subset of the binary code. In another embodiment employing a multi-phase search, only a subset of the signature may be searched for in a first phase. Upon finding the subset, the corresponding location of the binary code search may be compared with the whole signature.

Figure 9:
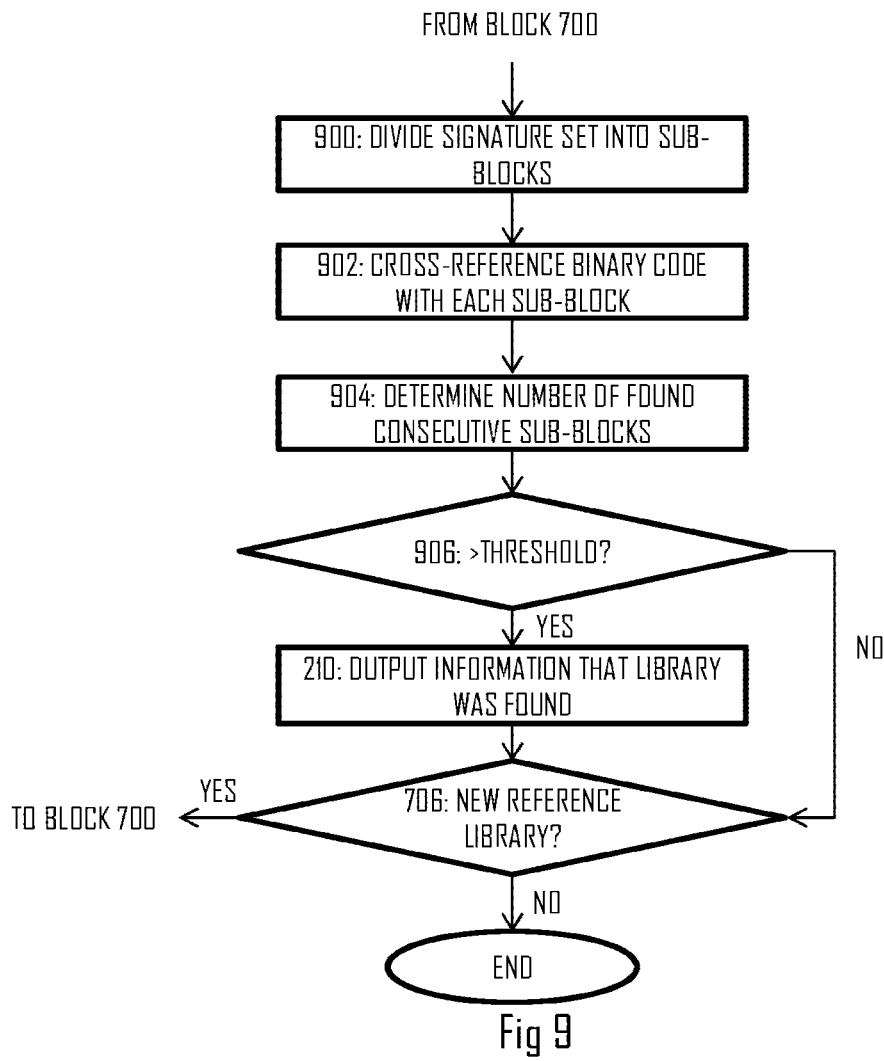
FIGS. 9 to 11 illustrate another embodiment of the testing phase in which the signature(s) is/are divided into sub-blocks.

In an embodiment of the testing phase, the signatures are divided into sub-blocks and the binary code being tested is searched for each sub-block. If a number of sub-blocks exceeding a determined threshold is found from the binary code, the binary code may be interpreted to comprise the reference library. FIG. 9 illustrates an embodiment of such a process. FIG. 9 illustrates processing with respect to a single signature of a reference library, but the same procedure applies to situations where multiple signatures are associated with the reference library. The process of FIG. 9 may be executed for each signature. Referring to FIG. 9, the signature is divided into a determined number of sub-blocks in block 900. In an embodiment, the signature is divided into a number of sub-blocks of determined length in which case the number of sub-blocks is dependent on the length of the signature. In another embodiment, the signature is divided into a determined number of sub-blocks in which case the length of each sub-block is dependent on the length of the signature. The sub-blocks may be indexed to represent their order in the signature. For example, let us assume a signature with length of 256 bytes with each byte consisting of eight binary values. The 256 bytes of the signature may be divided into 16 sub-blocks such that each sub-block consists of 16 bytes. A first sub-block indexed with "1" may comprise bytes 1 to 16, a second sub-block indexed with "2" may comprise bytes 17 to 32, and so on.

Figure 10:
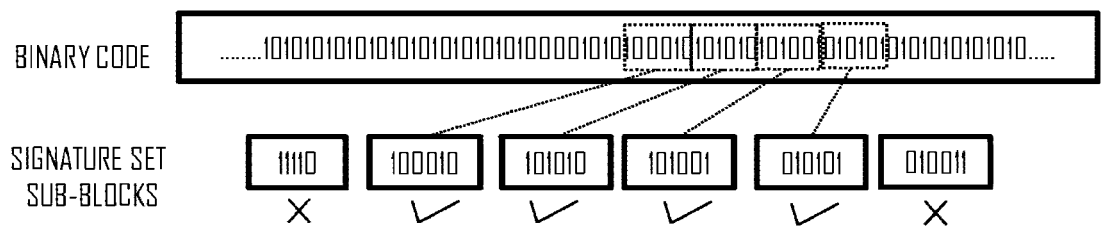
Figure 11:
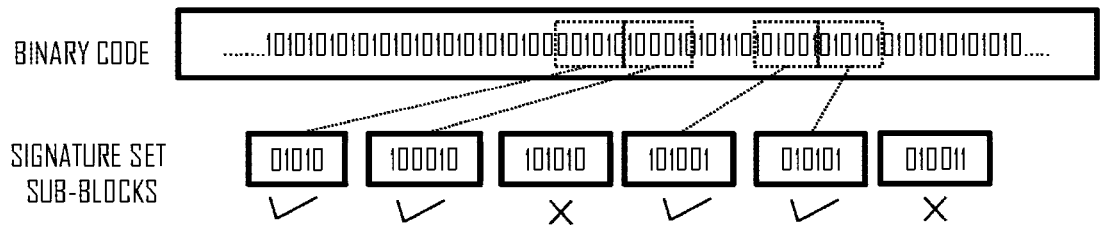

In block 902, the binary code being tested is cross-referenced with each sub-block. In block 904, the number of sub-blocks found from the binary code is determined. In particular, the number of contiguous sub-blocks that have been found from the binary code may be determined in block 904. This may be understood that the bytes of the contiguous sub-blocks that have been found are also found as contiguous in the binary code such that the bit combination of the aggregated contiguous sub-blocks is also found in the binary code. In this respect, let us refer to FIG. 10. FIG. 10 illustrates an example with only six sub-blocks. The first and the last sub-blocks have not been found from the binary code but the four middle sub-blocks have been found and, in particular, have been found such that the binary code contains the bit values of the sub-blocks in the order that matches with the indexing of the sub-blocks. Accordingly, block 904 may output an indication "four consecutive sub-blocks found". In FIG. 11, the first two sub-blocks were found and, additionally, another set of two contiguous sub-blocks were found. In this case, the number of contiguous detected sub-blocks is only two and, as a result, block 904 may output an indication "two consecutive sub-blocks found". The computer executing block 904 may determine a location where the detected sub-block having the lowest index was found in the binary code. Then, the computer may determine whether or not a sub-block having the subsequent index was detected. If not, the computer may take the next lowest detected sub-block into the processing. If the sub-block having the subsequent index was detected, the computer may search for the location where the bits of the sub-block were found and compare the location with the location of the previous sub-block. If the bits of the contiguous sub-blocks are found as contiguous in the binary code, the computer may determine that the binary code comprises the aggregated bit combination of the contiguous sub-blocks. Then, the computer may determine whether or not a sub-block having the subsequent index was detected. In this manner, the computer may determine the number of contiguous sub-blocks detected in the binary code. The number of contiguous sub-blocks detected in the binary code may then be compared with a threshold. If the number of contiguous sub-blocks detected in the binary code exceeds the threshold, the process may proceed to block 210. If not, the computer may determine that the signature was not found in the binary code.

As described in the embodiment above and in connection with FIGS. 10 and 11, more reliability is put to the sub-blocks that are not at edges of the signature, e.g. the first and the last sub-block of the signature. It has been found out that it is possible that the first and/or last bit values of each signature are not necessarily found from the binary code even if the binary code comprises the reference library. This may be a result of the above-mentioned padding added by a compiler to the library. Therefore, less weight may be assigned to the result of the detection of the first and/or last bits of each signature. In this manner, the probability of misinterpretations may be reduced.

Figure 12:
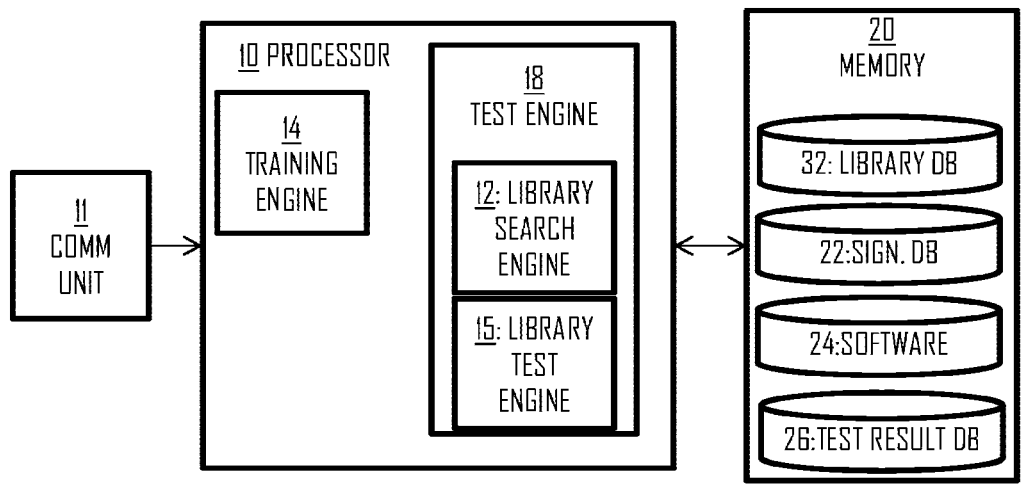
FIG. 12 illustrates a block diagram of a structure of an apparatus according to an embodiment of the invention.

FIG. 12 illustrates a block diagram of a structure of an apparatus according to an embodiment of the invention. The apparatus may be comprised in the server computer 104. The apparatus may be a computer, e.g. a network server or a workstation computer, comprising at least one processor 10 and at least one memory 20 including a computer program code 24, wherein the at least one memory 20 and the computer program code 24 are configured, with the at least one processor 10, to cause the apparatus to carry out the steps of the process of FIG. 2 executed by the server computer or any one of the embodiments described above.

Referring to FIG. 12, the apparatus comprises a communication unit 11 operating according to at least one communication protocol. The communication unit 11 may be configured to establish TCP/IP, UDP, or RTP connections, for example. It should, however, be appreciated that the communication protocol used between a client device and the server computer 104 does not limit the invention in any way. The apparatus may further comprise the memory 20 comprising a signature database 22 storing one or more signatures associated with each reference computer program library the apparatus is configured to search for. The apparatus may further comprise a library database 32 storing information for each reference library, e.g. known vulnerabilities, licensing status and/or rights associated with each reference library. The memory 20 may further store computer program code 24 defining the operation of the server computer 104 in connection with testing the applications, handling the subscriptions, updating the testing configuration, etc. The memory 20 may further comprise the test result database 26 storing any information acquired during the testing of the computer program code, e.g. a list of libraries detected in the binary code by using embodiments of the invention and results with respect to the testing applied to each library (known vulnerabilities and/or licensing status).

The apparatus may further comprise the processor 10 or a processing circuitry 10 configured to carry out the test operations and provide the testing service, as described above. The processor may be considered to encompass all of the following: (a) hardware-only circuit implementations such as implementations in only analogue and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present. This definition of the "processor" applies to all uses of this term. As a further example the term "processor" would also cover an implementation of multiple processors or portion of a processor, e.g. one core of a multi-core processor, and its (or their) accompanying software and/or firmware. It may be understood to encompass also an application-specific integrated circuit (ASIC), and/or a field-programmable grid array (FPGA) circuit for the apparatus according to an embodiment of the invention.

The processor 10 may acquire the binary code to be tested through the communication unit 11, or the processor 10 may retrieve the binary code from the memory 20. The processor 10 may comprise a training engine 14 as a sub-circuitry, wherein the training engine may be configured to perform the functions of the training phase described above in connection with any one of the FIGS. 2 and 4 to 6. The processor 10 may, additionally or alternatively, comprise a test engine 18 configured to carry out the functions of the testing phase described above in connection with any one of the FIGS. 2 and 7 to 11. The test engine 18 may comprise a library search engine 12 configured to search the binary code being tested for one or more of the reference libraries by searching for the signature(s) of the signature database 22 from the binary code. Upon finding a reference library in the binary code and identifying the library on the basis of the mapping between the signature and an identifier of the library in the signature database 22, the library search engine may output a notification to a library test engine 15. The notification may comprise the identifier of the library, e.g. the name of the library. Upon receiving the notification, the library test engine 15 may search the library database for the identified library and determine known vulnerabilities, licensing status, etc. of the library and store the results to the test result database 26 at a record created for the binary code being tested. As described above, the binary code may represent a computer program product such as a computer program application.

The sub-circuitries 12 to 18 of the processor 10 may be understood as separate physical circuitries or as different computer program modules executed by the same physical circuitry. The computer program code 24 stored in the memory 20 may define the functions performed by the sub-circuitries 12 to 18.

The processes or methods described in connection with FIGS. 2 to 11 may also be carried out in the form of one or more computer processes defined by one or more computer programs. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to computerized software testing systems defined above but also to other suitable systems. The testing protocols used, the computer program products, and computer devices develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

We claim:

1. A method for detecting a target computer program library in a binary computer program code, the method comprising:
creating, by a processor, a signature set corresponding to binary data from a section of a reference computer program library;
obtaining, by the processor, a debug symbol table corresponding to the reference computer program library;
mapping, by the processor, based on one or more references from the debug symbol table, a location of the reference program library to a corresponding location of the debugging instance, wherein the location of the reference program library is within the section of the reference computer program library;
searching, by the processor, the binary computer program code for the signature set, while maintaining the binary computer program code in raw form;
detecting, by the processor, at least part of the signature set in the binary computer program code, based on the searching; and
determining, by the processor, whether the binary computer program code comprises the target computer program library, based on the detected signature set.

2. The method of claim 1, wherein the detecting further comprises:
identifying, in the binary computer program code, at least one data constant corresponding to at least one point in the section of the reference computer program library.

3. The method of claim 1, wherein the detecting further comprises:
matching, in the binary computer program code, a plurality of sub-blocks of the signature set to a plurality of locations in the binary computer program code.

4. The method of claim 3, wherein the plurality of locations in the binary computer program code matched with the plurality of sub-blocks of the signature set comprise non-contiguous locations in the binary computer program code.

5. The method of claim 1, further comprising weighting specific sub-blocks of a plurality of sub-blocks of the signature, wherein a first set of the specific sub-blocks is weighted more heavily than a second set of the specific sub-blocks.

6. The method of claim 5, wherein the second set of the specific sub-blocks is associated with edges of a given signature of the signature set, and wherein the first set of the specific sub-blocks is associated with parts of the given signature not at the edges of the given signature.

7. The method of claim 1, further comprising assessing, in response to the determining, a compliance status of the binary computer program code with respect to a software license of the target computer program library.

8. The method of claim 1, further comprising assessing, in response to the determining, a vulnerability status of the binary computer program code.

9. A system comprising:
a memory; and
at least one processor coupled to the memory and configured to perform operations comprising:
creating a signature set corresponding to binary data from a section of a reference computer program library;
obtaining a debug symbol table corresponding to the reference computer program library;
mapping, based on references from the debug symbol table, a location of the reference program library to a corresponding location of the debugging instance, wherein the location of the reference program library is within the section of the reference computer program library;
searching a binary computer program code for the signature set, while maintaining the binary computer program code in raw form;
detecting at least part of the signature set in the binary computer program code based on the searching; and
determining whether the binary computer program code comprises the target computer program library, based on the detected signature set.

10. The system of claim 9, wherein the detecting further comprises:
identifying, in the binary computer program code, at least one data constant corresponding to at least one point in the section of the reference computer program library.

11. The system of claim 9, wherein the detecting further comprises:
matching, in the binary computer program code, a plurality of sub-blocks of the signature set to a plurality of locations in the binary computer program code, wherein the plurality of locations in the binary computer program code matched with the plurality of sub-blocks of the signature set comprise non-contiguous locations in the binary computer program code.

12. The system of claim 9, the operations further comprising weighting specific sub-blocks of a plurality of sub-blocks of the signature, wherein a first set of the specific sub-blocks is weighted more heavily than a second set of the specific sub-blocks, wherein the second set of the specific sub-blocks is associated with edges of a given signature of the signature set, and wherein the first set of the specific sub-blocks is associated with parts of the given signature not at the edges of the given signature.

13. The system of claim 9, the operations further comprising:
assessing, in response to the determining, a compliance status of the binary computer program code with respect to a software license of the target computer program library.

14. The system of claim 10, the operations further comprising assessing, in response to the determining, a vulnerability status of the binary computer program code.

15. A non-transitory computer-readable storage medium having instructions stored thereon that, when executed by at least one computing device, cause the at least one computing device to perform operations comprising:
creating a signature set corresponding to binary data from a section of a reference computer program library, based at least in part on a plurality of data constants in the binary data;
obtaining a debug symbol table corresponding to the reference computer program library;
mapping, based on references from the debug symbol table, a location of the reference program library to a corresponding location of the debugging instance, wherein the location of the program reference library is within the section of the reference computer program library;

searching a binary computer program code for the signature set, while maintaining the binary computer program code in raw form;

detecting at least part of the signature set in the binary computer program code, based on the searching; and determining whether the binary computer program code comprises the target computer program library, based on the detected signature set.

16. The non-transitory computer-readable storage medium of claim 15, wherein the detecting further comprises:

identifying, in the binary computer program code, at least one data constant corresponding to at least one point in the section of the reference computer program library.

17. The non-transitory computer-readable storage medium of claim 15, wherein the detecting further comprises:

matching, in the binary computer program code, a plurality of sub-blocks of the signature set to a plurality of locations in the binary computer program code, wherein the plurality of locations in the binary computer program code matched with the plurality of sub-blocks of the signature set comprise non-contiguous locations in the binary computer program code.

18. The non-transitory computer-readable storage medium of claim 15, the operations further comprising weighting specific sub-blocks of a plurality of sub-blocks of the signature, wherein a first set of the specific sub-blocks is weighted more heavily than a second set of the specific sub-blocks, wherein the second set of the specific sub-blocks is associated with edges of a given signature of the signature set, and wherein the first set of the specific sub-blocks is associated with parts of the given signature not at the edges of the given signature.

19. The non-transitory computer-readable storage medium of claim 15, the operations further comprising:

assessing, in response to the determining, a compliance status of the binary computer program code with respect to a software license of the target computer program library.

20. The non-transitory computer-readable storage medium of claim 15, the operations further comprising assessing, in response to the determining, a vulnerability status of the binary computer program code.

* * * * *